(12) United States Patent
Yan et al.

(10) Patent No.: US 9,627,917 B2
(45) Date of Patent: Apr. 18, 2017

(54) DEVICE FOR WIRELESS CHARGING CIRCUIT

(71) Applicant: Delta Electronics (Shanghai) CO., LTD, Shanghai (CN)

(72) Inventors: Chao Yan, Shanghai (CN); Lizhi Xu, Shanghai (CN); Xinlei Li, Shanghai (CN)

(73) Assignee: Delta Electronics (Shanghai) CO., LTD, Shanghai (CN)

( * ) Notice: Subject to any disclaimer, the term of this patent is extended or adjusted under 35 U.S.C. 154(b) by 211 days.

(21) Appl. No.: 14/475,231

(22) Filed: Sep. 2, 2014

(65) Prior Publication Data

US 2015/0108945 A1     Apr. 23, 2015

(30) Foreign Application Priority Data

Oct. 21, 2013   (CN) .......................... 2013 1 0496929

(51) Int. Cl.
*H02J 7/00* (2006.01)
*H01F 27/42* (2006.01)
(Continued)

(52) U.S. Cl.
CPC .............. *H02J 7/025* (2013.01); *H01F 38/14* (2013.01); *H02J 5/005* (2013.01); *H02J 7/0042* (2013.01);
(Continued)

(58) Field of Classification Search
CPC ........ H02J 7/025; H02J 7/0042; H02J 7/0052; H02J 5/005; H04B 5/0037
(Continued)

(56) References Cited

U.S. PATENT DOCUMENTS 4,814,962 A * 3/1989 Magalhaes .......... H02M 3/3376
363/16
6,052,571 A * 4/2000 Mishima ................. H01F 21/02
331/25

(Continued)

FOREIGN PATENT DOCUMENTS

CN          101911029 A      12/2010
CN          102157973 A       8/2011
(Continued)

OTHER PUBLICATIONS

Office Action issued Aug. 11, 2015 by the TW Office.
Office Action Issued on Apr. 12, 2016 by the CN Office.

*Primary Examiner* — M'Baye Diao
(74) *Attorney, Agent, or Firm* — Yunling Ren

(57) ABSTRACT

The present application discloses a device for wireless charging circuit, comprising: a primary circuit box, which comprises at least one first switch unit; a secondary circuit box, which comprises at least one second switch unit; a transmission plate, which comprises a primary inductor of a transformer and a primary compensation capacitor, the primary inductor being coupled in series with the primary compensation capacitor; a receiving plate, which comprises a secondary inductor of the transformer; the transmission plate and the receiving plate are magnetically coupled with each other; the transmission plate is coupled with the primary circuit box; and the receiving plate is coupled with the secondary circuit box. The voltage between external terminals of transmission plate and the voltage between external terminals of receiving plate can satisfy the safety requirement.

17 Claims, 8 Drawing Sheets

(51) Int. Cl.
*H02M 3/335* (2006.01)
*H02J 7/02* (2016.01)
*H02J 5/00* (2016.01)
*H02J 17/00* (2006.01)
*H01F 38/14* (2006.01)
*H01F 27/255* (2006.01)

(52) U.S. Cl.
CPC ............ *H02J 17/00* (2013.01); *H01F 27/255* (2013.01); *H02J 7/0052* (2013.01)

(58) Field of Classification Search
USPC .................. 320/108; 307/104; 363/17, 21.02
See application file for complete search history.

(56) References Cited

U.S. PATENT DOCUMENTS

| | | | | |
|---|---|---|---|---|
| 6,844,702 B2* | 1/2005 | Giannopoulos | ......... | H02J 7/025 320/108 |
| 7,375,984 B2* | 5/2008 | Lee Tai Keung | ....... | H02M 3/28 315/247 |
| 8,842,450 B2* | 9/2014 | Jungreis | ................ | H02M 3/285 363/21.03 |
| 9,077,194 B2* | 7/2015 | Covic | ..................... | H02J 5/005 |
| 9,237,211 B2* | 1/2016 | Tabe | ........................ | H04M 1/00 |
| 2004/0084973 A1* | 5/2004 | Jakob | ................. | H01F 27/2804 307/151 |
| 2010/0190435 A1 | 7/2010 | Cook et al. | | |
| 2011/0026282 A1* | 2/2011 | Chapman | .................. | H02J 3/38 363/65 |
| 2011/0198937 A1 | 8/2011 | Tseng | | |
| 2011/0254379 A1* | 10/2011 | Madawala | .............. | H02J 5/005 307/104 |
| 2012/0294047 A1* | 11/2012 | Wang | ................ | H02M 3/33576 363/21.02 |
| 2013/0119929 A1 | 5/2013 | Partovi | | |
| 2013/0188397 A1 | 7/2013 | Wu et al. | | |
| 2013/0229061 A1* | 9/2013 | Budhia | ................... | H02J 5/005 307/104 |
| 2014/0361634 A1* | 12/2014 | Scholz | ................ | H04B 5/0031 307/104 |
| 2015/0049516 A1* | 2/2015 | Yan | ................... | H02M 3/33507 363/17 |
| 2015/0049517 A1* | 2/2015 | Yan | ................... | H02M 3/33569 363/17 |
| 2015/0249483 A1* | 9/2015 | Ichikawa | ................ | H02J 5/005 320/108 |

FOREIGN PATENT DOCUMENTS

| | | |
|---|---|---|
| CN | 102665339 A | 9/2012 |
| CN | 103259345 A | 8/2013 |
| TW | 201334347 A | 8/2013 |

\* cited by examiner

DEVICE FOR WIRELESS CHARGING CIRCUIT

CROSS-REFERENCE TO RELATED APPLICATIONS

This application claims priority under 35 U.S.C. §119 to Chinese Patent Application No. 201310496929.3, filed on Oct. 21, 2013, the entire contents of which are incorporated herein by reference.

TECHNICAL FIELD

The present application relates to a device for wireless charging circuit.

BACKGROUND

In wireless power transmission, energy is transmitted from a primary coil to a secondary coil by electromagnetic induction or magnetic resonance. Wireless power transmission systems are used in many fields, such as electric cars, mobile phones or other electrical equipment.

As there is a larger air gap between the primary coil and the secondary coil of a transformer (for example, in an electric car or a hybrid car, the primary coil is mounted on the ground while the secondary coil is mounted on the bottom of the car), the coupling coefficient is low and the leakage inductance is large, so a capacitor is used for compensating the leakage inductance of the transformer.

The compensation circuit topology commonly used is of SS type, in which a compensation capacitor is coupled in series with the primary coil and a compensation capacitor is coupled in series with the secondary coil, as illustrated in FIG. 1. A DC input voltage is accepted by the switch inverter circuit, and then an AC square wave voltage is outputted to a resonant network constituted by the primary compensation capacitor Cp and the primary inductor L1 of the transformer, and the energy is transmitted via transformer to a secondary resonant network constituted by the secondary compensation capacitor Cs and the secondary inductor L2 of the transformer, and then a DC output voltage is obtained at the output terminal after the rectifying circuit, so as to provide energy to the load. For the switch inverter circuit, a full bridge circuit consisting of S1, S2, S3, S4 as shown in FIG. 1 may be used, and other switch circuits, such as the half bridge circuit, may also be used. Controllable switch devices such as MOSFET (Metal-Oxide-Semiconductor Field Effect Transistor), IGBT (Insulating Gate Bipolar Transistor) or the like may be used as the switch of the circuit. Except that the rectifier bridge may be constituted by D1, D2, D3, D4 as shown in FIG. 1, the rectifier circuit constituted by controllable switch devices such as MOSFET, IGBT or the like may also be used as the rectifier bridge.

In a conventional device structure, the primary inductor L1 and the secondary inductor L2 of the transformer are packaged respectively in the transmission plate and the receiving plate which are both a closed container, so that the requirements for insulation, waterproof and dustproof may be satisfied. As shown in FIG. 2, the primary compensation capacitor Cp may be packaged in a separate container. Alternatively, as shown in FIG. 3, the primary compensation capacitor Cp may be placed in a cabinet together with the primary switch circuit. Similarly, as shown in FIG. 2, the secondary compensation capacitor Cs may be packaged in a separate container. Alternatively, as shown in FIG. 3, the secondary compensation capacitor Cs may be placed in a cabinet together with the secondary rectifying circuit.

When the wireless transmission system operates with large output power, the primary current and the secondary current will become very large as the power increases, so the inductor voltage and the compensation capacitor voltage on the primary side as well as those on the secondary side will become very large. In this case, there may be high voltages up to thousands of volts occurring on external terminals (i.e., terminals BC of the primary inductor L1 of the transformer, terminals EF of the secondary inductor L2 of the transformer, terminals AB of the primary compensation capacitor Cp, or terminals DE of the secondary compensation capacitor Cs) in the above described structure. Also, these high voltages may be transmitted for long-distance through wires, so there may be a safety risk.

In addition to SS compensation circuit, the compensation circuit topology may also be PS compensation circuit (in which a compensation capacitor is coupled in parallel with the primary coil and a compensation capacitor is coupled in series with the secondary coil, as shown in FIG. 4) and SP compensation circuit (in which a compensation capacitor is coupled in series with the primary coil and a compensation capacitor is coupled in parallel with the secondary coil, as shown in FIG. 5). The above problems may also occur at the series-coupled compensation capacitor side in the PS compensation circuit and in the SP compensation circuit, as shown in FIG. 4 and FIG. 5.

Accordingly, the issue needs to be solved for eliminating the above defects of the related art.

SUMMARY OF THE INVENTION

One aspect of the present application is to provide the structure of a circuit device in which the voltage between external terminals of the transmission plate as well as the voltage between external terminals of the receiving plate may be effectively lowered so that the safety requirement may be satisfied in the wireless power supply.

According to an exemplary embodiment of the present invention, a device for wireless charging circuit is provided, the device comprising: a primary circuit box, which includes at least one first switch unit; a secondary circuit box, which includes at least one second switch unit; a transmission plate, which includes a primary inductor of a transformer and a primary compensation capacitor, the primary inductor being coupled in series with the primary compensation capacitor; a receiving plate, which includes a secondary inductor of the transformer; wherein, the transmission plate and the receiving plate are magnetically coupled with each other; the transmission plate is coupled with the primary circuit box; and the receiving plate is coupled with the secondary circuit box.

According to another exemplary embodiment of the present invention, a device for wireless charging circuit is provided, the device comprising: a primary circuit box, which includes at least one first switch unit; a secondary circuit box, which includes at least one second switch unit; a transmission plate, which includes a primary inductor of a transformer; a receiving plate, which includes a secondary inductor of the transformer and a secondary compensation capacitor, the secondary inductor being coupled in series with the secondary compensation capacitor; wherein, the transmission plate and the receiving plate are magnetically coupled with each other; the transmission plate is coupled with the primary circuit box; and the receiving plate is coupled with the secondary circuit box.

In one aspect, an inductor and a capacitor coupled in series are packaged together in another exemplary embodiment of the present application, so that the voltage between two terminals of an LC circuit may be lowered. Besides, the internal voltage may also be lowered by a plurality of capacitors coupled in series or a plurality of LC circuits coupled in series.

In the wireless power supply, the voltage between external terminals of the transmission plate as well as the voltage between external terminals of the receiving plate may be effectively lowered in the structure of circuit device provided by one or more embodiments of the present application, so that the safety requirement may be satisfied.

The above and other purposes, features and advantages of the present application may become more apparent from the following description of the exemplary embodiments with reference to the drawings. It is to be understood that both the foregoing general description and the following detailed description are by examples, and are intended to provide further explanation of the invention as claimed. The details disclosed above and below may not be all essential or necessary, and are not for limitation of present invention.

BRIEF DESCRIPTION OF THE DRAWINGS

The accompany drawings of the present application are provided for illustrating and schematic rather than limiting the present application. The illustrations of the spirit and substance of the present application would not be influenced by the biases of the proportion and size shown in the drawings, for those may be schematic. The drawings together with the description intend to provide further explanation of the present application, so as to facilitate those skilled in the art to better understand the present application. In the drawings.

DETAILED DESCRIPTION OF EMBODIMENTS

The embodiments of the present application will be described in more details with reference to the FIGS. 6-12 of the drawings. It should be understood that the embodiments are provided for illustrating and not for limiting the present application.

Figure 1:
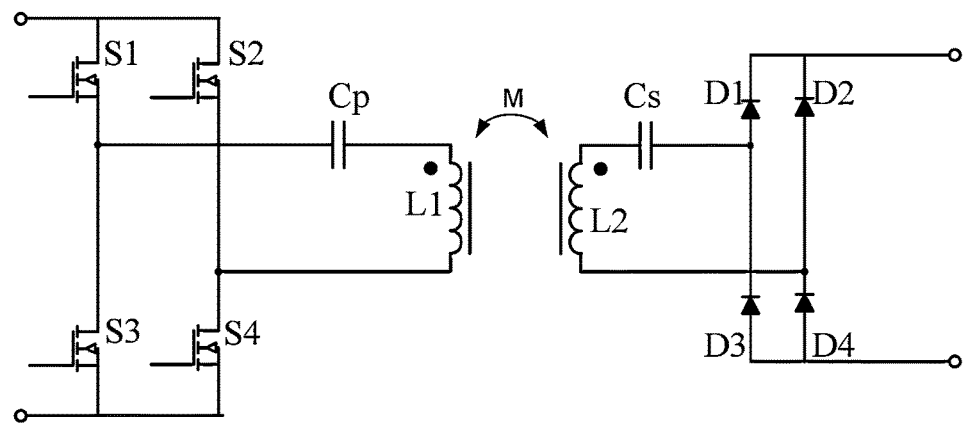
FIG. 1 is a schematic view showing the compensation circuit topology that a compensation capacitor is coupled in series with a primary coil and a compensation capacitor is coupled in series with a secondary coil.
Figure 2:
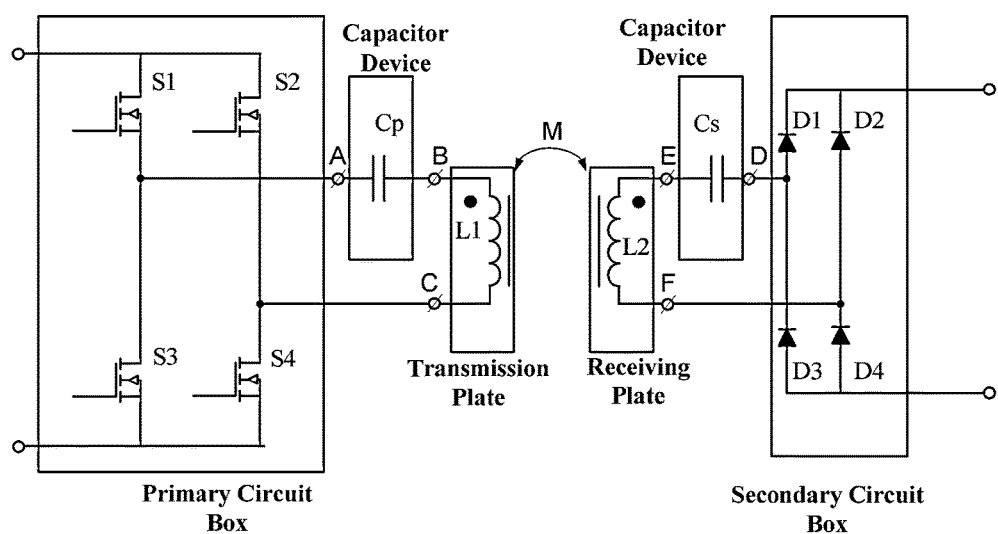
FIG. 2 is a schematic view showing the structure of a circuit device in which the primary inductor and the secondary inductor are packaged in separate closed containers respectively, and the primary compensation capacitor and the secondary compensation capacitor are packaged in separate containers respectively.
Figure 3:
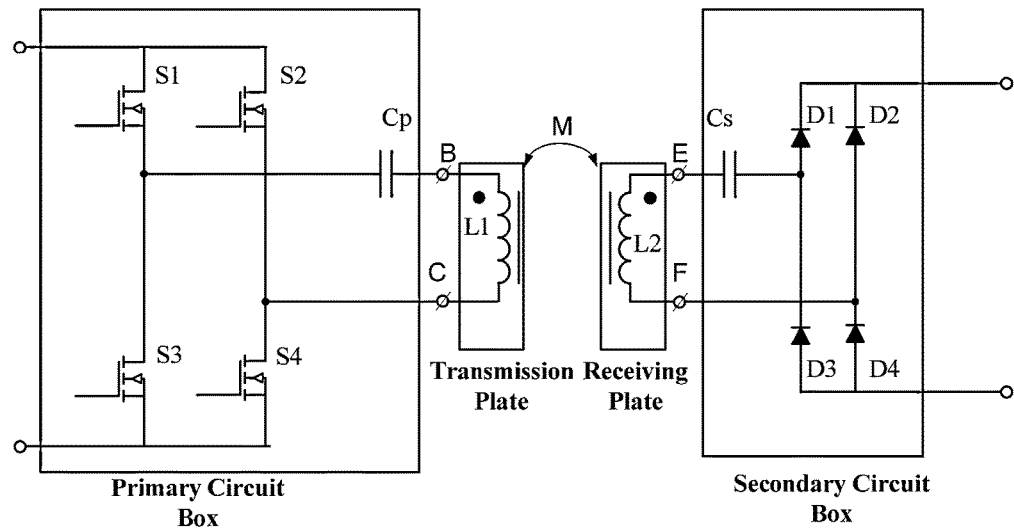
FIG. 3 is a schematic view showing the structure of a circuit device in which the primary inductor and the secondary inductor are packaged in separate closed containers respectively, the primary compensation capacitor is placed in a cabinet together with the primary switch circuit, and the secondary compensation capacitor is placed in a cabinet together with the secondary rectifying circuit.
Figure 4:
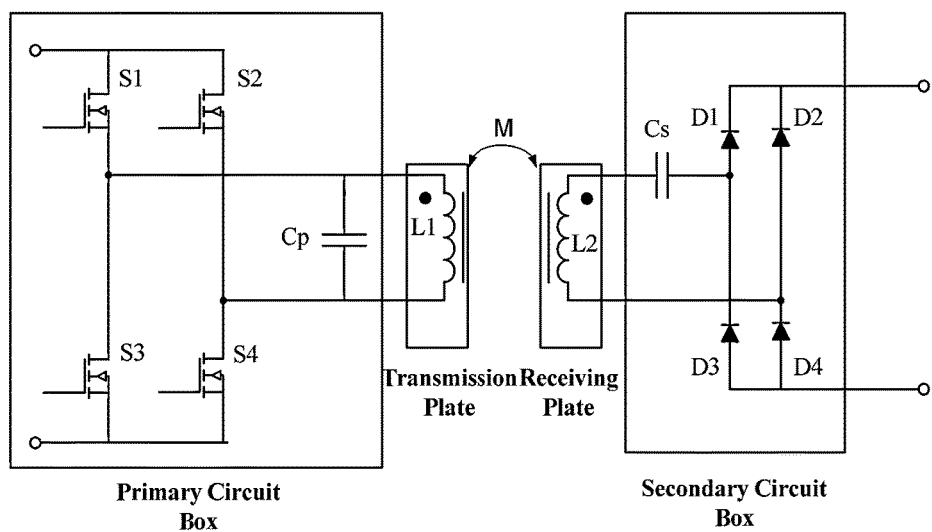
FIG. 4 is a schematic view showing the structure of a circuit device in which a compensation capacitor is coupled in parallel with the primary coil and a compensation capacitor is coupled in series with the secondary coil.
Figure 5:
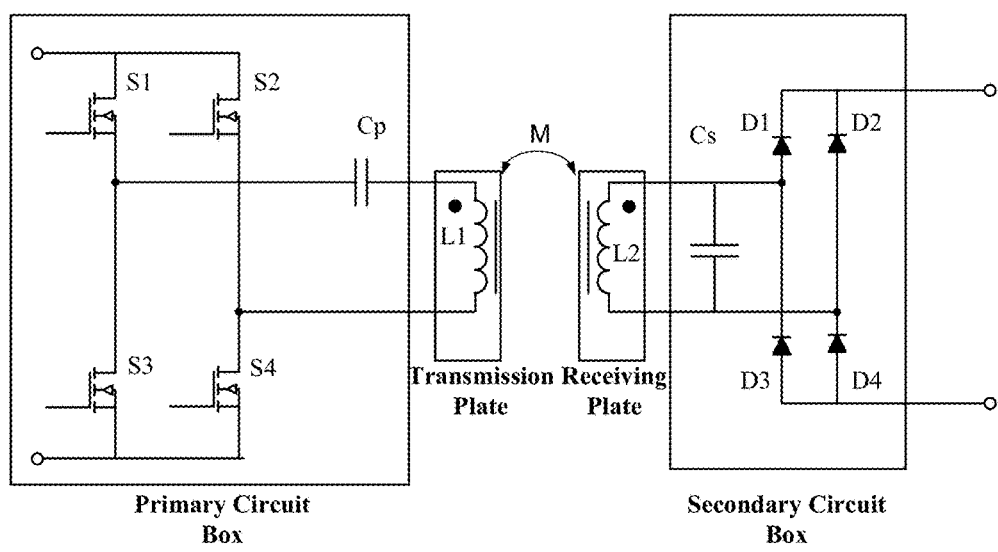
FIG. 5 is a schematic view showing the structure of a circuit device in which a compensation capacitor is coupled in series with the primary coil and a compensation capacitor is coupled in parallel with the secondary coil.
Figure 6:
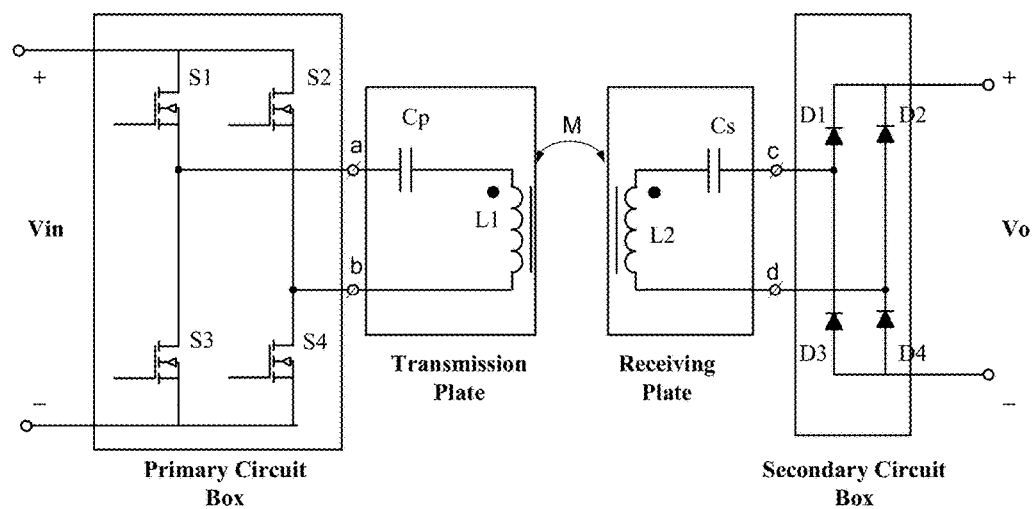
FIG. 6 is a schematic view showing the structure of a circuit device according to an embodiment of the present application, in which the transmission plate comprises the primary inductor and the primary compensation capacitor which are packaged together in a closed container, and the receiving plate comprises the secondary inductor and the secondary compensation capacitor which are packaged together in a closed container.

Referring to FIG. 6, FIG. 6 is a schematic view showing the structure of a circuit device according to an embodiment of the present application, in which the transmission plate comprises the primary inductor and the primary compensation capacitor which are packaged together in a closed container, and the receiving plate comprises the secondary inductor and the secondary compensation capacitor which are packaged together in a closed container.

In one or more embodiments, below is described. For the SS type, the primary inductor L1 and the primary compensation capacitor Cp are placed together in a closed container, as a transmission plate; the secondary inductor L2 and the secondary compensation capacitor Cs are placed together in a closed container, as a receiving plate; the switch inverter circuit and other related circuits are placed in the primary circuit box; the secondary rectifying circuit and other related circuits are placed in the secondary circuit box. For the SP type, the primary inductor L1 and the primary compensation capacitor Cp are placed together in a closed container, as a transmission plate; the secondary inductor L2 and the secondary compensation capacitor Cs may be placed together in a closed container, as a receiving plate, and the secondary rectifying circuit and other related circuits are placed in the secondary circuit box; the switch inverter circuit and other related circuits are placed in the primary circuit box. And alternatively, for the SP type, the secondary inductor L2 may be placed individually in a closed container, as a receiving plate, and the secondary compensation capacitor Cs and the secondary rectifying circuit and other related circuits are placed together in the secondary circuit box. For the PS type, the secondary inductor L2 and the secondary compensation capacitor Cs are placed together in a closed container, as a receiving plate; the primary inductor L1 and the primary compensation capacitor Cp may be placed together in a closed container, as a transmission plate, and the switch inverter circuit and other related circuits are placed in the primary circuit box. And alternatively, for the PS type, the primary inductor L1 may be placed individually in a closed container, as a transmission plate, and the primary compensation capacitor, the switch inverter circuit and other related circuits may be placed together in the primary circuit box; the secondary rectifying circuit and other related circuits may be placed in the secondary circuit box. It should be understood that the above descriptions are for examples and are not for limitation of the invention.

In the above described circuit device, besides the full bridge circuit consisting of S1, S2, S3, and S4 as shown in FIG. 6, the switch inverter circuit may be other switch circuits, such as the half bridge circuit. Controllable switch devices such as MOSFET, IGBT or the like may be used as the switch of the circuit. Except that the rectifier bridge may be constituted by the D1, D2, D3, D4 as shown in FIG. 6, the rectifier circuit constituted by controllable switch devices such as MOSFET, IGBT or the like can also be used as the rectifier bridge. For one or more embodiments, the circuit may use more than only one type of switch. And in one aspect, one or more embodiments of the invention can be suitable for multilevel inverters or the like. The present invention is not limited to the above descriptions.

Figure 7:
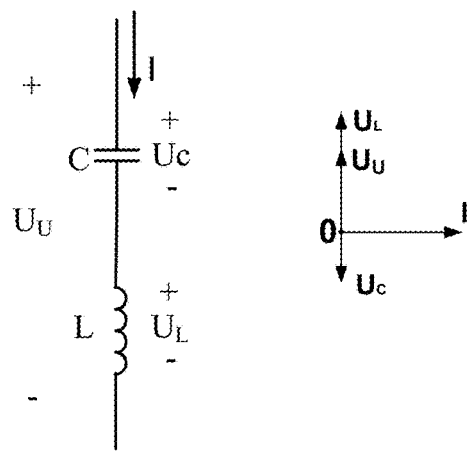
FIG. 7 is a schematic view showing the current-voltage relationship of an LC series circuit.

The voltages between any external terminals (such as the voltage between terminal a and terminal b, and the voltage between terminal c and terminal d) may be effectively lowered in the structure of one or more embodiments, so that the safety requirement may be satisfied. FIG. 7 is a schematic view showing the current-voltage relationship of an LC series circuit. As $U_L=I \times j\omega L$, $U_C=I \times 1/j\omega C$, when the AC current I flows through the inductor, the voltage $U_L$ on the inductor will lead ahead the current by 90 degrees; when the AC current I flows through the capacitor, the voltage $U_C$ on the capacitor will lag behind the current by 90 degrees; thus the direction of the voltage on the inductor is just opposite to that on the capacitor. Assuming that the voltage magnitude $U_L>U_C$, then the voltage magnitude $U_u$ can be obtained by the voltage magnitude $U_L$ minus the voltage magnitude $U_C$, and $U_u$ is less than the magnitude of the voltage on the inductor and has the same phase as the voltage on the inductor. The voltage magnitude $U_u$ is the terminal voltage of the LC unit, that is, the voltage between terminal a and terminal b or the voltage between terminal c and terminal d. It can thus be seen that the voltage between the terminals of the transmission plate as well as the voltage between the terminals of the receiving plate can be maintained at a lower level even if there are high voltages on L1, L2, Cp or Cs shown in FIG. 6.

From another point of view, the maximum voltage between the terminals of the transmission plate is equal to the DC bus voltage Vin of the switch circuit, as the terminals of the transmission plate are coupled directly to the bridge arms of the switch circuit. The maximum voltage between the terminals of the receiving plate is equal to the DC output voltage Vo, as the terminals of the receiving plate are coupled directly to the bridge arms of the rectifying circuit. Thus, the magnitudes of the DC bus voltage and DC output voltage being restricted may satisfy the safety requirement of the voltages between terminals.

Figure 8:
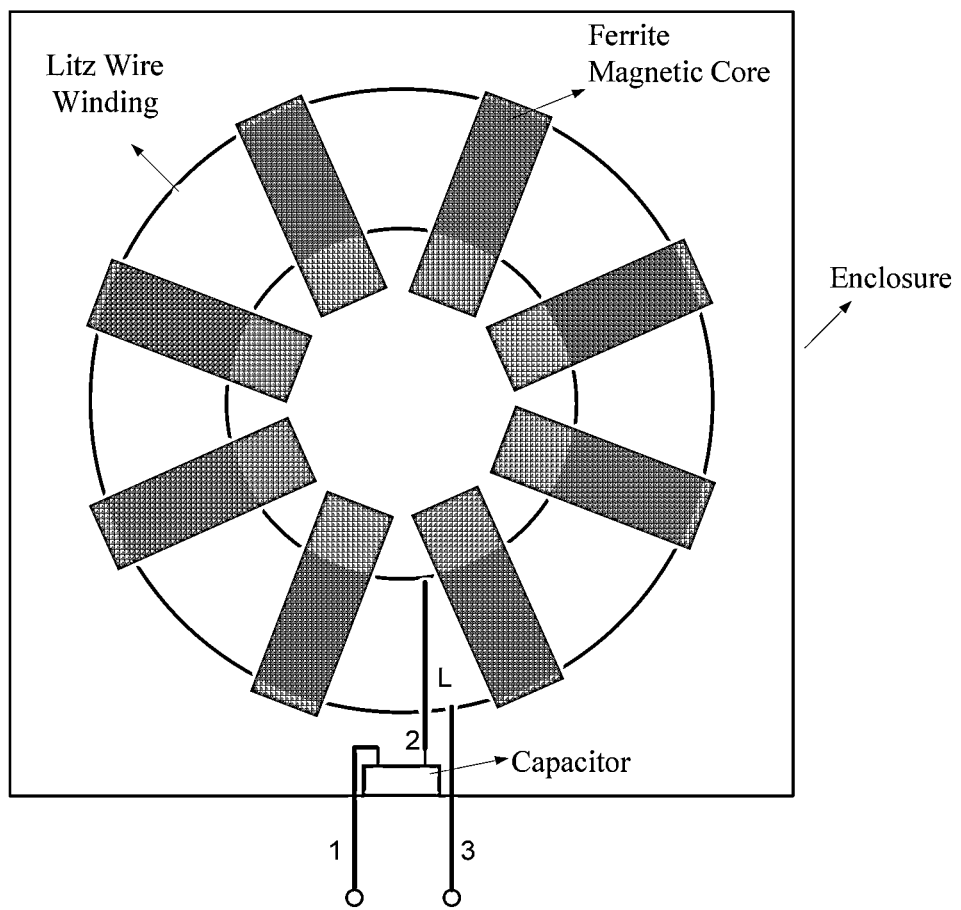
FIG. 8 is a schematic view showing an exemplary specific structure of the transmission plate or the receiving plate shown in FIG. 6.

FIG. 8 is a schematic view showing an exemplary specific structure of a transmission plate or a receiving plate shown in FIG. 6. It mainly includes a transformer winding, a magnetic core, a series-coupled compensation capacitor and an enclosure. As shown in FIG. 8, a solid capacitor may be used as the compensation capacitor; a Litz wire winding may be used as the transformer winding; a strip ferrite magnetic core may be used as the magnetic core; a plastic part with high pressure-resistant strength may be used as the enclosure, whose outer shape may be approximately circular or square, and the enclosure may be fastened by screws. The main coupling lines 1, 2, 3 are in the plate, where the coupling line 1 and the coupling line 3 are the outer terminals while the coupling line 2 is the internal coupling line. There are relatively high voltages on the inductor and on the capacitor, that is, the voltage between the coupling line 1 and the coupling line 2 and the voltage between the coupling line 2 and the coupling line 3 are relatively high, so it is needed that the high voltage insulation treatment is performed on the coupling lines 1, 2, 3 inside the plate; for example, Mylar tubes may be used as sheaths for the coupling lines 1, 2, 3. Because there is a relatively low voltage between the coupling line 1 and the coupling line 3 (i.e., between output terminals 1 and 3), any special treatment is not necessary to be made outside the transmission plate or the receiving plate.

Figure 9:
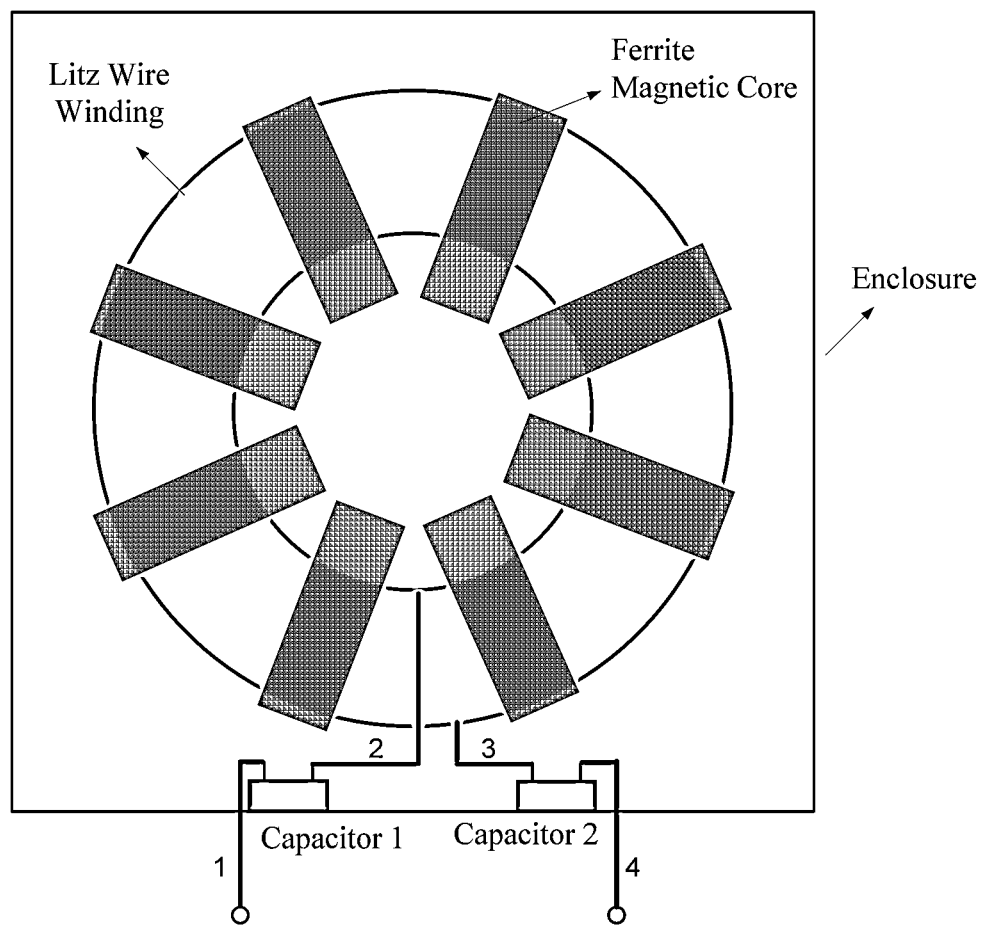
FIG. 9 is a schematic view showing another exemplary specific structure of the transmission plate or the receiving plate shown in FIG. 6.

FIG. 9 is a schematic view showing another exemplary specific structure of the transmission plate or the receiving plate shown in FIG. 6. It mainly includes a transformer winding, a magnetic core, a series-coupled compensation capacitor 1, a series-coupled compensation capacitor 2 and an enclosure. As shown in FIG. 9, a solid capacitor 1 (which may be the combination of a plurality of capacitors) may be used as the series-coupled compensation capacitor 1; a solid capacitor 2 (which may be the combination of a plurality of capacitors) may be used as the series-coupled compensation capacitor 2; a Litz wire winding may be used as the transformer winding; a strip ferrite magnetic core may be used as the magnetic core; a plastic part with high pressure-resistant strength may be used as the enclosure, whose outer shape may be approximately circular or square, and the enclosure may be fastened by screws. The main coupling lines 1, 2, 3, 4 are in the transmission plate or the receiving plate, where the coupling line 1 and the coupling line 4 are the outer terminals while the coupling line 2 and the coupling line 3 are the internal coupling lines. Being different from FIG. 6, the compensation capacitor is split into two series-coupled capacitors, and the two capacitors are respectively coupled in series with the external terminals. It is the advantage that the voltage on the capacitor may be divided into two voltages, thus the voltage between the coupling line 1 and the coupling line 2 and the voltage between the coupling line 3 and the coupling line 4 may be lowered, so that the high voltage insulation treatment inside the transmission plate or the receiving plate may be much easier to be performed. Additionally, there are relatively high voltages on the inductor and on the capacitors, that is, the voltage between the coupling line 2 and the coupling line 3 is relatively high, and the voltage between the coupling line 1 and the coupling line 2 and the voltage between the coupling line 3 and the coupling line 4 are both relatively high, so it is needed that the high voltage insulation treatment is performed on the coupling lines 1, 2, 3, 4 inside the transmission plate or the receiving plate. For example, Mylar tubes may be used as sheaths for the coupling lines 1, 2, 3, 4. Because there is a relatively low voltage between the coupling line 1 and the coupling line 4 (i.e., between output terminals 1 and 4), any special treatment is not necessary to be made outside the transmission plate or the receiving plate. The number of capacitors coupled in series may be two or more in order that the voltage on each of the capacitors may be lowered further.

Figure 10:
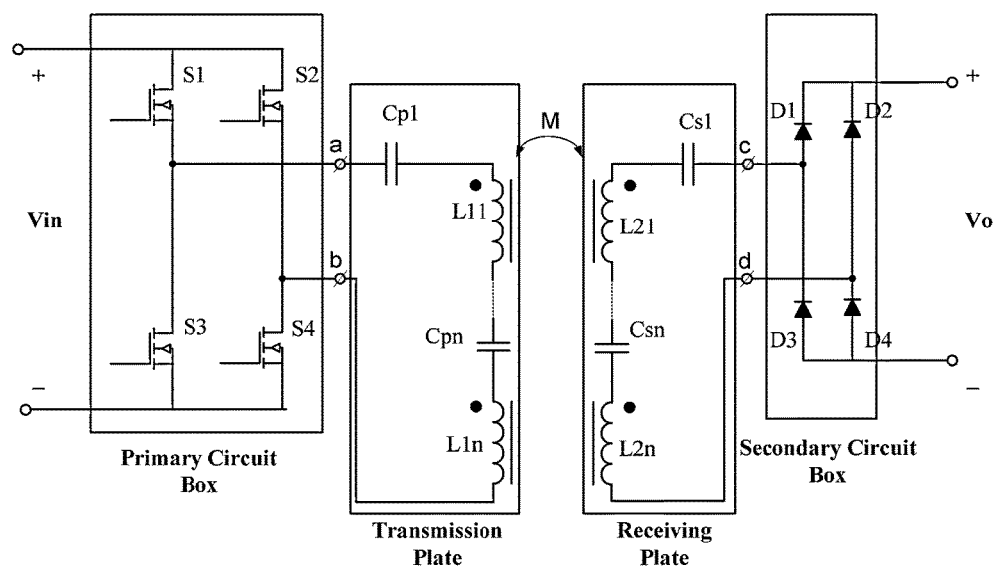
FIG. 10 is a schematic view showing the structure of another circuit device according to an embodiment of the present application.

FIG. 10 is a schematic view showing the structure of another circuit device according to an embodiment of the present application. Being different from the circuit device shown in FIG. 6, the compensation capacitor and the primary inductor in the transmission plate are split into n (n≥2) units, and the compensation capacitor and the secondary inductor in the receiving plate are split into n (n≥2) units, and each of the units includes an inductor and a compensation capacitor. The voltage on each compensation capacitor may be lowered further by this structure, and the voltage between any two points inside the transmission plate or the receiving plate may also be lowered, because inside each unit, the voltage on the inductor offsets the voltage on the capacitor partially.

Figure 11:
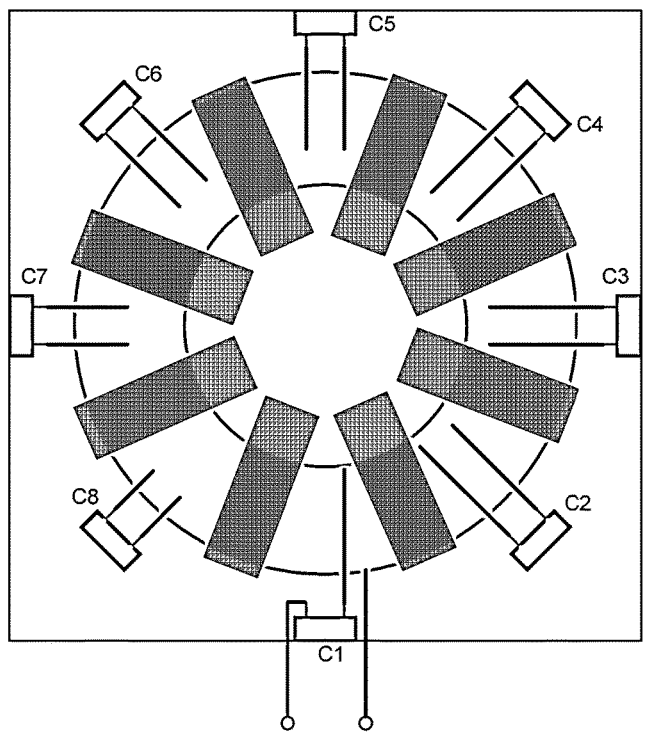
FIG. 11 is a schematic view showing an exemplary specific structure of the transmission plate or the receiving plate shown in FIG. 10.

FIG. 11 is a schematic view showing an exemplary specific structure of the transmission plate or the receiving plate shown in FIG. 10, taking n=8 as an example. It mainly includes a split transformer winding, a magnetic core, series-coupled compensation capacitors C1, C2, . . . , C8 and an enclosure. As shown in FIG. 11, solid capacitors may be used as the series-coupled compensation capacitors C1, C2, . . . , C8, and each of the solid capacitors may be the combination of a plurality of capacitors; a Litz wire winding may be used as the transformer winding; a strip ferrite magnetic core may be used as the magnetic core; a plastic part with high pressure-resistant strength may be used as the enclosure, whose outer shape may be approximately circular or square, and the enclosure may be fastened by screws. There are more internal coupling lines in this structure, so that the voltage on each of the capacitors may be lowered further, thus the high voltage insulation treatment inside the transmission plate or the receiving plate may be much easier to be performed.

Figure 12:
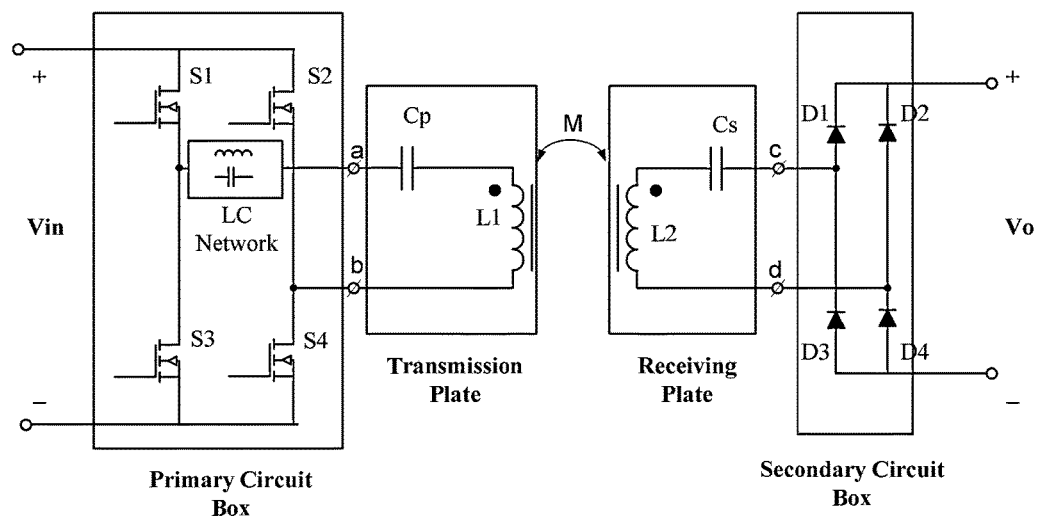
FIG. 12 is a schematic view showing the structure of another circuit device according to an embodiment of the present application.

FIG. 12 is a schematic view showing the structure of still another circuit device according to an embodiment of the present application. Being different from the circuit device shown in FIG. 6, an LC circuit network is coupled in series with the output terminal of the full bridge switch circuit in the primary circuit box, and the LC circuit network includes at least one inductor and at least one capacitor which are series-coupled or parallel-coupled. For more inductors and capacitors in the LC circuit, they may be coupled in series, parallel or mixed. An LC circuit network may also be coupled with the input terminal of the full bridge rectifying circuit in the secondary circuit box in the same way.

For one or more embodiments, an inductor and a capacitor coupled in series are packaged together in the present application, which takes advantage of the property that the voltage polarity of the inductor is contrary to that of the capacitor coupled in series with the inductor, so that the voltage between two terminals of a series-coupled LC circuit may be lowered. Furthermore, the internal voltage may also be lowered by a plurality of capacitors coupled in series or a plurality of LC circuits coupled in series.

It should be understood that for those skilled in the art, the above features described with reference to a certain embodiment are not limited to be applied to the embodiment, but can be applied in combination with other features described with reference to other embodiments.

Although the present application has been described with reference to the exemplary embodiments thereof, it should be understood that the terms used in this specification are illustrative and exemplary rather than restrictive. Since the present application may be implemented in many forms without departing from the spirit or essence of the invention, it should be understood that the above embodiments are not limited to any foregoing details, and should be widely interpreted within the spirit and scope defined by the appended claims. Thus, all the alterations and modifications falling within the scope of the claims and the equivalents thereof should be encompassed by the appended claims.

What is claimed is:

1. A device for wireless charging circuit, the device comprising:
a primary circuit box, which comprises at least one first switch unit;
a secondary circuit box, which comprises at least one second switch unit;
a transmission plate, which comprises a primary inductor of a transformer and a primary compensation capacitor, the primary inductor being coupled in series with the primary compensation capacitor; and
a receiving plate, which comprises a secondary inductor of the transformer;
wherein the transmission plate and the receiving plate are magnetically coupled with each other; the transmission plate is coupled with the primary circuit box; and the receiving plate is coupled with the secondary circuit box; and
the transmission plate is a closed container, and the receiving plate is a closed container.

2. The device according to claim 1, wherein the receiving plate further comprises a secondary compensation capacitor, and the secondary inductor of the transformer is coupled in series with the secondary compensation capacitor.

3. The device according to claim 1, wherein the receiving plate further comprises a secondary compensation capacitor, and the secondary inductor of the transformer is coupled in parallel with the secondary compensation capacitor.

4. The device according to claim 1, wherein the secondary circuit box further comprises a secondary compensation capacitor, and the secondary inductor of the transformer is coupled in parallel with the secondary compensation capacitor.

5. The device according to claim 1, wherein the first switch unit comprises at least one bridge arm comprising two switches coupled in series, and the second switch unit comprises at least one bridge arm comprising two switches coupled in series.

6. The device according to claim 5, wherein each of the switches is a MOSFET or an IGBT or a diode.

7. The device according to claim 2, wherein the primary compensation capacitor of the transmission plate and the secondary compensation capacitor of the receiving plate respectively comprise a plurality of capacitors coupled in series.

8. The device according to claim 2, wherein the primary inductor and the primary compensation capacitor of the transmission plate and the secondary inductor and the secondary compensation capacitor of the receiving plate respectively consist of a plurality of units coupled in series, and each of the units comprises an inductor and a capacitor coupled in series.

9. The device according to claim 1, wherein the primary circuit box or the secondary circuit box further comprises a LC circuit network which comprises an inductor and a capacitor.

10. A device for wireless charging circuit, the device comprising:
a primary circuit box, which comprises at least one first switch unit;
a secondary circuit box, which comprises at least one second switch unit;
a transmission plate, which comprises a primary inductor of a transformer;
a receiving plate, which comprises a secondary inductor of the transformer and a secondary compensation capacitor, the secondary inductor being coupled in series with the secondary compensation capacitor; wherein
the transmission plate and the receiving plate are magnetically coupled with each other;

the transmission plate is coupled with the primary circuit box;

the receiving plate is coupled with the secondary circuit box; and the transmission plate is a closed container, and the receiving plate is a closed container.

11. The device according to claim 10, wherein the transmission plate further comprises a primary compensation capacitor, and the primary inductor of the transformer is coupled in parallel with the primary compensation capacitor.

12. The device according to claim 10, wherein the primary circuit box further comprises a primary compensation capacitor, and the primary inductor of the transformer is coupled in parallel with the primary compensation capacitor.

13. The device according to claim 10, wherein the first switch unit comprises at least one bridge arm comprising two switches coupled in series, and the second switch unit comprises at least one bridge arm comprising two switches coupled in series.

14. The device according to claim 13, wherein each of the switches is a MOSFET or an IGBT or a diode.

15. The device according to claim 11, wherein the primary compensation capacitor of the transmission plate and the secondary compensation capacitor of the receiving plate respectively comprise a plurality of capacitors coupled in series.

16. The device according to claim 10, wherein the secondary inductor and the secondary compensation capacitor of the receiving plate consist of a plurality of units coupled in series, and each of the units comprises an inductor and a capacitor coupled in series.

17. The device according to claim 10, wherein the primary circuit box or the secondary circuit box further comprises an LC circuit network which comprises an inductor and a capacitor.

* * * * *